(12) United States Patent
Kauppi et al.

(10) Patent No.: US 12,366,036 B2
(45) Date of Patent: Jul. 22, 2025

(54) METHOD FOR MANUFACTURING A FILM COMPRISING HIGHLY REFINED CELLULOSE FIBERS

(71) Applicant: Stora Enso OYJ, Helsinki (FI)

(72) Inventors: Anna Kauppi, Lappeenranta (FI); Isto Heiskanen, Imatra (FI); Kaj Backfolk, Lappeenranta (FI); Jukka Kankkunen, Imatra (FI); Mikael Hjerpe, Karlstad (SE); Juha Korvenniemi, Oriniemi (FI)

(73) Assignee: Stora Enso OYJ, Helsinki (FI)

( * ) Notice: Subject to any disclaimer, the term of this patent is extended or adjusted under 35 U.S.C. 154(b) by 274 days.

(21) Appl. No.: 18/042,120

(22) PCT Filed: Aug. 31, 2021

(86) PCT No.: PCT/IB2021/057939
§ 371 (c)(1),
(2) Date: Feb. 17, 2023

(87) PCT Pub. No.: WO2022/049481
PCT Pub. Date: Mar. 10, 2022

(65) Prior Publication Data
US 2023/0313464 A1   Oct. 5, 2023

(30) Foreign Application Priority Data
Sep. 1, 2020 (SE) .................... 2051031-9

(51) Int. Cl.
| | | |
|---|---|---|
| D21H 11/18 | (2006.01) | |
| D21F 1/02 | (2006.01) | |
| D21F 1/10 | (2006.01) | |
| D21F 1/20 | (2006.01) | |
| D21F 1/74 | (2006.01) | |
| D21F 11/02 | (2006.01) | |
| D21H 27/30 | (2006.01) | |

(52) U.S. Cl.
CPC .............. D21H 11/18 (2013.01); D21F 1/02 (2013.01); D21F 1/10 (2013.01); D21F 1/20 (2013.01); D21F 1/74 (2013.01); D21F 11/02 (2013.01); D21H 27/30 (2013.01)

(58) Field of Classification Search
CPC ........ D21H 11/18; D21H 27/30; D21H 27/10; D21F 1/02; D21F 1/10; D21F 1/20; D21F 1/74; D21F 11/02; D21F 1/0018; D21F 1/0009; D21F 1/08; D21C 9/007; B32B 27/10; B32B 29/005; B32B 2307/7244; C08J 2301/04; C08J 3/03; C08J 5/18; C08L 1/04; B65D 65/40
See application file for complete search history.

(56) References Cited

U.S. PATENT DOCUMENTS

| | | | | |
|---|---|---|---|---|
| 1,322,489 A * | 11/1919 | Howard | ................... | D21B 1/00 162/187 |
| 1,536,599 A * | 5/1925 | Aldrich | ...................... | D21F 9/02 162/356 |
| 1,856,347 A * | 5/1932 | McDonnell | ............... | D21F 9/02 162/354 |
| 2,092,798 A * | 9/1937 | Charlton | ................... | D21F 1/18 162/356 |
| 2,699,709 A * | 1/1955 | Breuning | ............... | H02K 33/18 162/209 |
| 3,232,828 A * | 2/1966 | Ouellet | ..................... | F16D 3/40 162/209 |
| 3,489,644 A * | 1/1970 | Rhine | ....................... | D21F 1/20 162/308 |
| 4,055,460 A * | 10/1977 | Buchanan | ................. | D21F 1/20 162/209 |
| 4,420,370 A * | 12/1983 | Saad | ........................ | D21F 1/483 162/209 |
| 5,681,430 A * | 10/1997 | Neun | .................... | D21F 1/0018 162/356 |
| 6,214,163 B1 * | 4/2001 | Matsuda | ................ | D21H 27/38 162/28 |

(Continued)

FOREIGN PATENT DOCUMENTS

| | | | | |
|---|---|---|---|---|
| CA | 3118522 A1 | 5/2020 | | |
| CN | 116096791 A * | 5/2023 | ................ | C08J 3/03 |

(Continued)

OTHER PUBLICATIONS

Notice from Swedish priority application No. 2051031-9, dated Apr. 19, 2021.
Extended European Search Report from corresponding European application No. 21863803.9 dated Sep. 20, 2024.
International Search Report from corresponding PCT application No. PCT/IB2021/057939, mailed Nov. 10, 2021.
D. Fengel, Ultrastructural behaviour of cell wall polysaccharides, TAPPI, 1970, vol. 53, No. 3, pp. 497-503 (abstract only).
Gary Chinga-Carrasco, Cellulose fibres, nanofibrils and microfibrils: The morphological sequence of MFC components from a plant physiology and fibre technology point of view, Chinga-Carrasco Nanoscale Research Letters, 2011, 6:417.

*Primary Examiner* — Jose A Fortuna
(74) *Attorney, Agent, or Firm* — Greer, Burns & Crain, Ltd.

(57) ABSTRACT

The present invention relates to a method for manufacturing a film comprising highly refined cellulose fibers in a paper-making machine, the method comprising the steps of: a) providing an aqueous pulp suspension comprising at least 20% by dry weight of highly refined cellulose fibers having an SR (Schopper-Riegier) value in the range of 80-100 at a consistency in the range of 0.8-3 wt % and; b) deflocculating and diluting the aqueous pulp suspension to a lower consistency in the range of 0.1-1.5 wt % by injecting the aqueous pulp suspension into an aqueous stream using a high shear mixer to obtain a diluted aqueous pulp suspension; and c) feeding the diluted aqueous pulp suspension to a headbox of the paper-making machine.

15 Claims, No Drawings

(56) References Cited

U.S. PATENT DOCUMENTS

| | | | |
|---|---|---|---|
| 8,163,136 B2* | 4/2012 | Cabrera Y Lopez Caram | D21F 9/00 162/208 |
| 8,747,618 B2* | 6/2014 | Cabrera Y Lopez Caram | D21F 1/66 162/208 |
| 9,988,762 B2* | 6/2018 | Bilodeau | D21D 1/306 |
| 10,794,006 B2* | 10/2020 | Phipps | D04H 3/08 |
| 2014/0202648 A1* | 7/2014 | Faufau | D21F 1/80 162/209 |
| 2016/0201262 A1* | 7/2016 | Faufau | D21F 1/80 162/209 |
| 2017/0073893 A1* | 3/2017 | Bilodeau | D21D 1/306 |
| 2017/0342661 A1* | 11/2017 | Aulin | D21H 23/50 |
| 2023/0103392 A1* | 4/2023 | Phipps | D04H 1/4258 428/401 |
| 2023/0279612 A1* | 9/2023 | Tahamtan | D21H 11/18 162/9 |
| 2023/0313464 A1* | 10/2023 | Kauppi | D21F 1/02 162/132 |

FOREIGN PATENT DOCUMENTS

| | | | |
|---|---|---|---|
| EP | 0875622 A2 | 11/1998 | |
| EP | 2771390 A2 | 9/2014 | |
| EP | 3350372 B1 | 1/2020 | |
| SE | 546123 C2 * | 5/2024 | B32B 29/04 |
| SE | 2230374 A1 * | 6/2024 | B32B 29/02 |
| WO | 2011056135 A1 | 5/2011 | |
| WO | 2013038061 A1 | 3/2013 | |
| WO | 2013060934 A2 | 5/2013 | |
| WO | 2014091413 A1 | 6/2014 | |
| WO | 2015173474 A1 | 11/2015 | |
| WO | WO-2016097964 A1 * | 6/2016 | D21H 11/18 |
| WO | WO-2017006241 A1 * | 1/2017 | B29B 13/023 |
| WO | 2017046749 A1 | 3/2017 | |
| WO | 2017141205 A1 | 8/2017 | |
| WO | 2018229333 A1 | 12/2018 | |
| WO | 2019008500 A1 | 1/2019 | |
| WO | 2019123191 A1 | 6/2019 | |
| WO | WO-2020157609 A1 * | 8/2020 | B32B 29/08 |
| WO | WO-2022049481 A1 * | 3/2022 | C08J 3/03 |
| WO | WO-2024105465 A1 * | 5/2024 | D21C 9/007 |

* cited by examiner

METHOD FOR MANUFACTURING A FILM COMPRISING HIGHLY REFINED CELLULOSE FIBERS

This application is a U.S. National Phase under 35 U.S.C. § 371 of International Application No. PCT/IB2021/057939 filed Aug. 31, 2021, which claims priority under 35 U.S.C. §§ 119 and 365 to Swedish Application No. 2051031-9 filed Sep. 1, 2020.

TECHNICAL FIELD

The present disclosure relates to methods for manufacturing gas barrier films, e.g. useful in paper and paperboard based packaging materials. More specifically, the present disclosure relates to methods for manufacturing films comprising highly refined cellulose fibers, particularly films comprising microfibrillated cellulose (MFC).

BACKGROUND

Effective gas, aroma, and/or moisture barriers are required in packaging industry for shielding sensitive products. Particularly, oxygen-sensitive products require an oxygen barrier to extend their shelf-life. Oxygen-sensitive products include many food products, but also pharmaceutical products and electronic industry products. Known packaging materials with oxygen barrier properties may be comprised of one or several polymer films or of a fibrous paper or board coated with one or several layers of an oxygen barrier polymer, usually as part of a multilayer coating structure. Another important property for packaging for food products is resistance to grease and oil.

More recently, microfibrillated cellulose (MFC) films have been developed, in which defibrillated cellulosic fibrils have been suspended e.g. in water, re-organized and rebonded together to form a continuous film. MFC films have been found to provide good gas barrier properties as well as good resistance to grease and oil.

MFC films may be made by use of casting technologies, including applying an MFC dispersion onto a non-porous cast substrate, such as a polymeric or metal substrate, and drying said film by evaporation. The advantages of this technology include uniform thickness distribution and a smooth surface of the film. The publication EP2771390 A4 describes preparation of MFC films, in which an aqueous cellulose nanofiber dispersion is coated on a paper or polymeric substrate, dried and finally peeled off as a nanofiber film sheet.

A problem connected with the casting process is that when the film is forming in the drying step, the slow diffusion of water restricts the drying rate. The diffusion of water vapor through the film is a slow process which has a negative impact on the process efficiency. If the drying speed is increased, pinholes may be formed in the film, deteriorating its barrier properties. A further problem with the cast process is the formation of shrink tensions and stresses in the formed film caused by drying and removal of water, which may have a negative impact on its strength properties, such as strain at break or tensile strength.

Alternatively, the film can be made by applying an MFC suspension on a porous substrate forming a web followed by dewatering of the web by draining water through the substrate for forming the film. The porous substrate may for example be a membrane or wire fabric or it can be a paper or paperboard substrate. Formation of the web can be accomplished e.g. by use of a paper- or paperboard machine type of process.

Manufacturing of films and barrier substrates from highly refined cellulose or suspension with very slow drainage is difficult on a paper machine since it is difficult to create good barriers due to occurrence of pinholes. Pinholes are microscopic holes that can appear in the web during the forming process. Examples of reasons for the appearance of pinholes include irregularities in the pulp suspension; e.g. formed by flocculation or re-flocculation of fibrils, rough dewatering fabric, uneven pulp distribution on the wire, or too low a web grammage. Pinhole formation typically increases with increased dewatering speed. However, in pinhole free areas, the Oxygen Transmission Rate value is good when grammage is above 20-40 $g/m^2$.

MFC fibrils, especially native fibrils, have a tendency to create flocs at low shear rates, typically 1-100 1/s. However, this problem has not been associated with MFC film or paper manufacturing and its relevance for obtaining a homogenous film and good barrier properties.

The flocculation problem is not only affecting barrier properties of the film, but also drainage and strength properties.

Current solutions include adding long fibrils or fibers to improve strength properties and adding dispersing or anti-flocculating agents to prevent flocculation. However, adding long fibrils or fibers impact barrier performance negatively, and adding dispersing or anti-flocculating agents influence drainage negatively.

From a technical and economical point of view, it would be preferable to find an improved method which allows for manufacture of MFC films in paper- or paperboard machine type of process, which reduces the problems with poor drainage and strength properties, while maintaining good barrier properties.

DESCRIPTION OF THE INVENTION

It is an object of the present disclosure to provide a method for manufacturing a film comprising highly refined cellulose fibers, such as microfibrillated cellulose (MFC), which alleviates at least some of the above-mentioned problems associated with prior art methods.

It is a further object of the present disclosure to provide an improved method for manufacturing a film comprising highly refined cellulose fibers in a paper- or paperboard machine type of process.

It is a further object of the present disclosure to provide a method for manufacturing a film comprising highly refined cellulose fibers, which reduces the problems with poor drainage and strength properties, while maintaining good barrier properties of the film.

The above-mentioned objects, as well as other objects as will be realized by the skilled person in the light of the present disclosure, are achieved by the various aspects of the present disclosure.

According to a first aspect illustrated herein, there is provided a method for manufacturing a film comprising highly refined cellulose fibers in a paper-making machine, the method comprising the steps of:
  a) providing an aqueous pulp suspension comprising at least 20% by dry weight of highly refined cellulose fibers having an SR (Schopper-Riegler) value in the range of 80-100 at a consistency in the range of 0.8-3 wt % and;

b) deflocculating and diluting the aqueous pulp suspension to a lower consistency in the range of 0.1-1.5 wt % by injecting the aqueous pulp suspension into an aqueous stream using a high shear mixer to obtain a diluted aqueous pulp suspension; and c) feeding the diluted aqueous pulp suspension to a headbox of the paper-making machine.

The highly refined cellulose fibers of the pulp suspension have a SR (Schopper-Riegler) value in the range of 80-100. The highly refined cellulose fibers may for example be microfibrillated cellulose (MFC).

The inventive method allows for improved manufacturing of a film comprising highly refined cellulose fibers in a paper machine type of process. The invention is based on the inventive realization that deflocculating and diluting an aqueous pulp suspension comprising highly refined cellulose fibers at a consistency in the range of 0.8-3 wt % in a high shear mixer before feeding the deflocculated and diluted pulp suspension to the headbox of a paper-making machine leads to a range of advantages in the forming section of the paper machine.

MFC fibrils, especially native fibrils, have a tendency to create flocs at low shear rates, typically 1-100 1/s. The flocs cause pinhole formation during dewatering of the web in the forming process, which in turn affect the barrier properties, and may also affect the strength properties of the film. Passing the pulp suspension through a high shear mixer is believed to disperse flocs formed in the pulp suspension and result in a more uniform suspension. Reducing the amount of flocs in the pulp suspension prior to forming may therefore improve the barrier and strength properties of the finished film.

The term film as used herein refers generally to a thin continuous sheet formed material. Depending on the composition of the pulp suspension, the film can also be considered as a thin paper or even as a membrane.

The film preferably has a grammage below 100 g/m$^2$, preferably in the range of 20-100 g/m$^2$, The film is typically relatively dense. Because of the content of highly refined cellulose fibers, the resulting MFC film will typically have a density above 600 kg/m$^3$, preferably above 900 kg/m$^3$. Such films have been found to be very useful as gas barrier films, e.g. in packaging applications. The MFC films can be used to replace conventional barrier films, such as synthetic polymer films or aluminum foils which reduce the recyclability of paper or paperboard packaging products. The MFC films have high repulpability, providing for high recyclability of the films and paper or paperboard packaging products comprising the films.

The inventive method is performed in a paper machine, more preferably in a Fourdrinier paper machine, optionally equipped with a hybrid former or a twin-wire former. A paper machine (or paper-making machine) is an industrial machine which is used in the pulp and paper industry to create paper in large quantities at high speed. Modern paper-making machines are typically based on the principles of the Fourdrinier machine, which uses a moving woven mesh, a so-called "wire", to create a continuous web by filtering out the fibrous material held in a pulp suspension and producing a continuously moving wet web of fiber. This wet web is then typically dried in the machine to produce a strong paper web or film.

The forming and dewatering steps of the inventive method are performed at the forming section of the paper machine, commonly called the wet end. The wet web is formed on the wire in the forming section of the paper machine.

The pulp suspension is applied to the wire using a headbox. The function of the headbox is to distribute the pulp suspension uniformly across the width of the wire.

In the headbox, the pulp suspension pumped in a pipe is converted to a uniform rectangular flow with the same flow rate and flow direction across the wire width.

The headbox typically consists of a manifold distributor, flow stabilization elements and slice. The manifold distributor is a tapered header which converts the pipe flow into a rectangular flow with same velocity, quantity and jet thickness across the width of the wire section.

The headbox serves several purposes:
(1) to provide a uniform and stable jet with a constant speed in the "machine direction" (MD) with no lateral "cross direction" (CD) components;
(2) to create controlled in the pulp suspension turbulence to disperse flocs and create a uniform suspension; and
(3) to accelerate the pulp suspension up to a high speed for fast paper production.

After being applied to the wire, the wet web is partially dewatered on the wire. Dewatering of the web on the wire may be performed using methods and equipment known in the art, examples include but are not limited to table roll and foils, suction boxes, friction less dewatering and ultra-sound assisted dewatering. The water drained from the web is referred to as white water. The white water is typically collected in a wire tank and recirculated to the headbox in a flow loop referred to as the short circulation.

The aqueous pulp suspension provided in step a) is an aqueous suspension comprising a water-suspended mixture of cellulose based fibrous material and optionally non-fibrous additives. The inventive method uses pulp suspensions comprising highly refined cellulose fibers. Refining, or beating, of cellulose pulps refers to mechanical treatment and modification of the cellulose fibers in order to provide them with desired properties.

The highly refined cellulose fibers can be produced from different raw materials, for example softwood pulp or hardwood pulp. The highly refined cellulose fibers are preferably never dried cellulose fibers. In some embodiments, the highly refined cellulose fibers are native highly refined cellulose fibers. With native fibers is meant fibers that are cooked and optionally bleached but that is not chemically modified.

The aqueous pulp suspension provided in step a) comprises highly refined cellulose fibers having a Schopper-Riegler (SR) value in the range of 80-100, preferably in the range of 80-98 or in the range of 85-98, as determined by standard ISO 5267-1.

The aqueous pulp suspension provided in step a) has a consistency in the range of 0.8-3 wt %. In some embodiments, the consistency of the aqueous pulp suspension provided in step a) is in the range of 1-2.5 wt %, preferably in the range of 1-2 wt %, and more preferably in the range of 1-1.75 wt %.

The dry solids content of the pulp suspension may be comprised solely of the highly refined cellulose fibers, or it can comprise a mixture of the highly refined cellulose fibers and other ingredients or additives. Floc formation increases with increasing content of highly refined cellulose fibers, and accordingly, the inventive method is more useful the higher the content of highly refined cellulose fibers in the pulp suspension. In some embodiments, the pulp suspension comprises at least 30% by dry weight, at least 40% by dry weight, at least 50% by dry weight, at least 70% by dry weight, at least 80% by dry weight or at least 90% by dry weight of the highly refined cellulose fibers, based on the total dry weight of the pulp suspension. The pulp suspension preferably includes highly refined cellulose fibers as its main component based on the total dry weight of the pulp suspension. In preferred embodiments, the pulp suspension comprises at least 50% by dry weight, at least 70% by dry weight, at least 80% by dry weight or at least 90% by dry weight of the highly refined cellulose fibers, based on the total dry weight of the pulp suspension.

In some embodiments, the highly refined cellulose fibers of the pulp suspension is refined Kraft pulp. Refined Kraft pulp will typically comprise at least 10% by dry weight of hemicellulose. Thus, in some embodiments the pulp suspension comprises hemicellulose at an amount of at least 10% by dry weight, such as in the range of 10-25% by dry weight, of the amount of the highly refined cellulose fibers.

The pulp suspension may further comprise additives such as native starch or starch derivatives, cellulose derivatives such as sodium carboxymethyl cellulose, a filler, retention and/or drainage chemicals, flocculation additives, deflocculating additives, dry strength additives, softeners, cross-linking aids, sizing chemicals, dyes and colorants, wet strength resins, fixatives, de-foaming aids, microbe and slime control aids, or mixtures thereof. The pulp suspension may further comprise additives that will improve different properties of the mixture and/or the produced film such as latex and/or polyvinyl alcohol (PVOH) for enhancing the ductility of the film.

The inventive method is especially useful for manufacturing films of so called microfibrillated cellulose (MFC). Thus, in some embodiments the highly refined cellulose fibers are MFC.

Microfibrillated cellulose (MFC) shall in the context of the patent application be understood to mean a nano scale cellulose particle fiber or fibril with at least one dimension less than 1000 nm, MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No, 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as its large surface area or its ability to form a gel-like material at low solids (1-5 wt %) when dispersed in water.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be utilized may thus be pre-treated, for example enzymatically or chemically, to hydrolyse or swell the fibers or to reduce the quantity of hemicellulose or lignin. The cellulose fibers may be chemically modified before fibrillation, such that the cellulose molecules contain other (or more) functional groups than found in the native cellulose. Such groups include, among others, carboxymethyl (CMC), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to disintegrate the fibers into MFC or nanofibrils.

The nanofibrillar cellulose may contain some hemicelluloses, the amount of which is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose, or other chemicals present in wood fibers or in papermaking process. The product might also contain various amounts of micron size fiber particles that have not been efficiently fibrillated.

MFC is produced from wood cellulose fibers, both from hardwood and softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper. In some embodiments, at least some of the MFC is obtained from MFC broke. In some embodiments, the MFC is native MFC.

The dry solids content of the pulp suspension may be comprised solely of MFC, or it can comprise a mixture of MFC and other ingredients or additives. The pulp suspension preferably includes MFC as its main component based on the total dry weight of the pulp suspension. In some embodiments, the pulp suspension comprises 50-99% by dry weight, preferably at least 70-99% by dry weight, more preferably at least 80-99% by dry weight of MFC, based on the total dry weight of the pulp suspension.

In addition to the highly refined cellulose fibers, the pulp suspension may also comprise a certain amount of unrefined or slightly refined cellulose fibers. The term unrefined or slightly refined fibers as used herein preferably refers to cellulose fibers having a Schopper-Riegler (SR) value below 30, preferably below 28, as determined by standard ISO 5267-1. Unrefined or slightly refined cellulose fibers are useful to enhance dewatering and may also improve strength and fracture toughness of the film. In some embodiments, the pulp suspension comprises 0.1-50% by dry weight, preferably 0.1-30% by dry weight, and more preferably 0.1-10% by dry weight of unrefined or slightly refined cellulose fibers, based on the total dry weight of the pulp suspension. The unrefined or slightly refined cellulose fibers may for example be obtained from bleached or unbleached or mechanical or chemimechanical pulp or other high yield pulps. The unrefined or slightly refined cellulose fibers are preferably never dried cellulose fibers.

The pH value of the pulp suspension may typically be in the range of 4-10 preferably in the range of 5-8, and more preferably in the range of 5.5-7.5.

The temperature of the pulp suspension may typically be in the range of 30-70° C., preferably in the range of 40-60° C., and more preferably in the range of 45-55° C.

According to the inventive method the pulp suspension is subjected to a high shear rate, or high shear forces during or just prior to dilution in an aqueous stream. The SI unit of measurement for shear rate is 1/s. By high shear rate in this respect is typically meant a shear rate of at least 500 1/s, or more than 1000 1/s. It is preferred that the shear rate is less than 200 000 1/s or even more preferred less than 150 000 1/s.

The deflocculation and dilution of the aqueous pulp suspension using the high shear mixer is preferably performed in the short circulation prior to the head box. By the short circulation is meant the flow loop from the wire tank where the white water is collected when the pulp is dewatered on the wire, through pumps and cleaning systems, to the headbox and back to the wire tank.

The high shear mixer can be static mixer or a dynamic mixer. A static mixer does not have any moving elements in the mixing zone, whereas a dynamic mixer uses moving elements to apply shear to the suspension. The high shear mixer may for example be any one of a TrumpJet® mixer, a high pressure liquid injection apparatus, an ultrasound apparatus, a high pressure drop apparatus, or a high shear mixing apparatus, or any combination of these.

The TrumpJet® mixer is a type of static mixer, which provides for an effective mixing of the pulp suspension with the aqueous stream. The ultrasound apparatus may be for instance an ultrasonic mixing device. The desired shear rate can also be produced with moving or rotating elements, such as a cavitron, a continuous high-shear homogenizer mixing system. The high pressure liquid injection apparatus may for instance include narrow channels or capillaries.

In some embodiments, the high shear mixer is a TrumpJet® mixer.

In some embodiments, the aqueous pulp suspension in step b) is injected into the aqueous stream at a flow speed in of at least 10 m/s, preferably at least 15 m/s, more preferably at least 20 m/s.

As mentioned, the consistency of the aqueous pulp suspension provided in step a) is in the range of 0.8-3 wt %, preferably in the range of 1-2.5 wt %, preferably in the range of 1-2 wt %, and more preferably in the range of 1-1.75 wt %.

The aqueous pulp suspension is diluted to a lower consistency in the range of 0.1-1.5 wt %. In some embodiments, the consistency of the diluted aqueous pulp suspension obtained in step b) is in the range of 0.1-1.2 wt %, preferably in the range of 0.4-0.9 wt %, and more preferably in the range of 0.55-0.8 wt %.

Diluting the aqueous pulp suspension during or just after the deflocculation using the high shear mixer improves the dispersing effect. By adding water or any other dilution liquid during the high shear mixing of the gel the dispersion of the pulp suspension is improved.

The aqueous stream used for diluting the aqueous pulp suspension in step b) preferably comprises less than 0.5 wt % of highly refined cellulose fibers, or is free from highly refined cellulose fibers. The aqueous stream can be clean water or an aqueous solution or suspension having a low solids content, preferably below 0.5 wt %. The solids content may for example comprise chemicals or MFC. The aqueous stream may for example be white water, i.e. drainage water from the pulp dewatering process.

Preferably, a major portion of the solid content of the diluted aqueous pulp suspension obtained in step b) has been subjected to the deflocculation using the high shear mixer in step b). In other words, a major portion of the solid content of the diluted aqueous pulp suspension obtained in step b) has been supplied by the aqueous pulp suspension provided in step a). In some embodiments, at least 50%, preferably at least 60%, preferably at least 70%, preferably at least 80%, preferably at least 90%, more preferably at least 95% of the solid content of the diluted aqueous pulp suspension obtained in step b) has been subjected to the deflocculation using the high shear mixer in step b). In preferred embodiments, at least 80%, preferably at least 90%, more preferably at least 95% of the solid content of the diluted aqueous pulp suspension obtained in step b) has been subjected to the deflocculation using the high shear mixer in step b).

The diluted aqueous pulp suspension obtained in step b) is subsequently fed to a headbox of the paper-making machine. In some embodiments, the high shear mixer is arranged in close connection with the headbox, such that reflocculation of the fibrils before the pulp suspension is applied to a wire is prevented. In some embodiments, measures are taken to prevent further flocculation of the fibrils during the transport to the headbox. In order to prevent further flocculation of the fibrils during the transport to the headbox, the diluted pulp suspension flow speed between the high shear mixer and the headbox, preferably does not fall below 2.5 m/s. Preferably, the flow speed between the high shear mixer and the headbox does not fall below 3 m/s, and more preferably it does not fall below 4 m/s. Preferably also in the headbox manifold tubes the flow speed does not fall below 2.5 m/s, more preferably not below 3 m/s, and more preferably not below 4 m/s.

The inventive method is performed in a paper machine, more preferably in a Fourdrinier paper machine. A paper machine (or paper-making machine) is an industrial machine which is used in the pulp and paper industry to create paper in large quantities at high speed. Modern paper-making machines are typically based on the principles of the Fourdrinier machine, which uses a moving woven mesh, a so-called "wire", to create a continuous web by filtering out the fibrous material held in a pulp suspension and producing a continuously moving wet web of fiber. This wet web is then typically dried in the machine to produce a strong paper web or film.

Thus, in some embodiments, the method further comprises the steps:
d) forming a wet web by applying the diluted pulp suspension from the headbox onto a moving wire; and
e) dewatering, and optionally drying, the wet web to obtain a film comprising the highly refined cellulose fibers.

The wire is preferably an endless wire. The wire used in the inventive method preferably has relatively high porosity in order to allow fast dewatering of the pulp suspension. The air permeability of the wire is preferably above 5000 $m^3/m^2/$hour at 100 Pa. The wires may preferably comprise at least 500 knuckles per $cm^2$, and more preferably at least 1000 knuckles per $cm^2$ to reduce fiber marking. In some embodiments, the wire speed in the machine direction is >350 m/min, preferably >450 m/min, and more preferably >550 m/min.

After being formed, the wet web is partially dewatered on the wire. Dewatering of the web on the wire may be performed using methods and equipment known in the art, examples include but are not limited to table roll and foils, suction boxes, friction less dewatering and ultra-sound assisted dewatering. The water drained from the web is referred to as white water. The white water is collected in a wire tank and recirculated to the headbox in a flow loop referred to as the short circulation. Dewatering means that the dry solids content of the wet web is reduced compared to the dry solids content of the pulp suspension, but the dewatered web may still comprise a significant amount of water. In some embodiments, dewatering of the wet web means that the dry solids content of the dewatered web is above 1 wt % but below 15 wt %. In some embodiments, dewatering of the wet web means that the dry solids content of the dewatered web is above 1 wt % but below 10 wt %.

In the further dewatering and optional drying step b), the dry solids content of the web is typically further increased. The resulting film preferably has a dry solids content above 90 wt %.

The further dewatering typically comprises pressing the web to squeeze out as much water as possible. The further dewatering may for example include passing the formed web through a press section of a paper machine, where the web passes between large rolls loaded under high pressure to squeeze out water. The removed water is typically received by a fabric or felt. In some embodiments, the dry solids content of the film after the further dewatering is in the range of 15-48 wt %, preferably in the range of 18-40 wt %, and more preferably in the range of 22-35 wt %.

The optional drying may for example include drying the web by passing the web around a series of heated drying cylinders. Drying may typically reduce the water content in the web down to a level of about 1-15 wt %, preferably to about 2-10 wt %.

The dry solids content of the final film may vary depending on the intended use of the film. For example a film for use as a stand-alone product may have a dry solids content in the range of 85-99 wt %, preferably in the range of 90-98 wt %.

The finished film is typically collected on a reel, e.g. using a pope reel arrangement.

The basis weight of the wet web, and the film, based on total dry weight is typically less than 100 g/m$^2$, preferably less than 60 g/m$^2$, and more preferably less than 40 g/m$^2$. In some embodiments, the basis weight of the wet web, and the film, based on total dry weight is in the range of 10-100 g/m$^2$, preferably in the range of 10-60 g/m$^2$, more preferably in the range of 20-40 g/m$^2$, For economical reasons, the film is preferably made as thin as possible without compromising with the barrier properties. The problems, such as pinholes caused by floc formation are especially pronounced in thinner films, such as in the range of 20-40 g/m$^2$. Pinhole free films with basis weights in this range has been found have good oxygen barrier properties, so the inventive method may be especially advantageous for preparing films having a basis weight in the range of 20-40 g/m$^2$.

In some embodiments, the wire is subjected to shaking during forming in step a) and dewatering in step b). Shaking the wire during forming and dewatering helps to prevent further floc formation in the wet web.

The invention is described herein mainly with reference to an embodiment wherein the film is formed from a single web layers comprising highly refined cellulose fibers. However, it is understood that the film may also comprise additional web layers comprising highly refined cellulose fibers. Thus, it is also possible that the formed film is formed from two or more web layers comprising highly refined cellulose fibers, such as two, three, four, five, six, or seven layers. The forming, composition and structure of each additional layer may be further characterized as described above with reference to the web layer.

In some embodiments, the film comprising the MFC or highly refined cellulose fibers is formed as a layer of a multilayer film.

In some embodiments, the method further comprises the steps:
d) forming a wet web by applying the diluted pulp suspension from the headbox onto a moving wire; and
e) partially dewatering the wet web to obtain a partially dewatered wet web;
f) laminating the partially dewatered wet web with a second partially dewatered wet web to form a multilayer web; and
g) dewatering, and optionally drying, the multilayer web to obtain a film comprising the highly refined cellulose fibers.

In some embodiments, the film comprising the MFC or highly refined cellulose fibers is formed as a mid-layer of a multilayer film comprised of 3 or more layers.

The film obtained with the inventive method will typically exhibit a lower specific formation number than films obtained with conventional methods, without high shear mixing. The specific formation number of the film obtained with the inventive method will typically be less than 0.8, preferably less than 0.6, and more preferably less than 0.4.

Pinholes are microscopic holes that can appear in the web during the forming process. Examples of reasons for the appearance of pinholes include irregularities in the pulp suspension, e.g. formed by flocculation or re-flocculation of fibrils, rough dewatering fabric, uneven pulp distribution on the wire, or too low a web grammage. In some embodiments, the film comprises less than 10 pinholes/m$^2$, preferably less than 8 pinholes/m$^2$, and more preferably less than 2 pinholes/m$^2$, as measured according to standard EN13676: 2001. The measurement involves treating the film with a coloring solution (e.g. dyestuff E131 Blue in ethanol) and inspecting the surface microscopically.

The film will typically exhibit good resistance to grease and oil. Grease resistance of the film is evaluated by the KIT-test according to standard ISO 16532-2. The test uses a series of mixtures of castor oil, toluene and heptane. As the ratio of oil to solvent is decreased, the viscosity and surface tension also decrease, making successive mixtures more difficult to withstand. The performance is rated by the highest numbered solution which does not darken the sheet after 15 seconds. The highest numbered solution (the most aggressive) that remains on the surface of the paper without causing failure is reported as the "kit rating" (maximum 12). In some embodiments, the KIT value of the film is at least 6, preferably at least 8, as measured according to standard ISO 16532-2.

In some embodiments, the film has a Gurley Hill value of at least 10 000 s/100 ml, preferably at least 25000 s/100 ml, and more preferably at least 40 000 s/100 ml, as measured according to standard ISO 5636/6.

The film preferably has high repulpability. In some embodiments, the film exhibits less than 30%, preferably less than 20%, and more preferably less than 10% reject, when tested as a category II material according to the PTS-RH 021/97 test method.

Films comprising high amounts of highly refined cellulose fibers are typically transparent or translucent to visible light. Thus, in some embodiments the film is transparent or translucent to visible light.

According to a second aspect illustrated herein, there is provided a film comprising highly refined cellulose, wherein the film is obtainable by the inventive method.

The films are especially suited as thin packaging films when coated or laminated with one or more layers of a thermoplastic polymer. Thus, the film may preferably be coated or laminated with one or more polymer layers.

The film may be provided with a polymer layer on one side or on both sides.

The polymer layer may comprise any of the thermoplastic polymers commonly used in paper or paperboard based packaging materials in general or polymers used in liquid packaging board in particular. Examples include polyethylene (PE), polyethylene terephthalate (PET), polypropylene (PP), polylactic acid (PLA), polyglycolic acid (PGA), polyhydroxyalkanoates (PHA), starch and cellulose. Polyethylenes, especially low density polyethylene (LDPE) and high density polyethylene (HDPE), are the most common and versatile polymers used in liquid packaging board.

Thermoplastic polymers, are useful since they can be conveniently processed by extrusion coating techniques to form very thin and homogenous films with good liquid barrier properties. In some embodiments, the polymer layer comprises polypropylene or polyethylene. In preferred embodiments, the polymer layer comprises polyethylene, more preferably LDPE or HDPE.

The polymer layer may comprise one or more layers formed of the same polymeric resin or of different polymeric resins. In some embodiments the polymer layer comprises a mixture of two or more different polymeric resins. In some embodiments the polymer layer is a structure comprised of two or more layers, wherein a first layer is comprised of a first polymeric resin and a second layer is comprised of a second polymeric resin, which is different from the first polymeric resin.

In some embodiments, the polymer layer is formed by extrusion coating of the polymer onto a surface of the film. Extrusion coating is a process by which a molten plastic material is applied to a substrate to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

The basis weight of each polymer layer of the film is preferably less than 50 g/m². In order to achieve a continuous and substantially defect free film, a basis weight of the polymer layer of at least 8 g/m², preferably at least 12 g/m² is typically required. In some embodiments, the basis weight of the polymer layer is in the range of 8-50 g/m², preferably in the range of 12-50 g/m².

Generally, while the products, polymers, materials, layers and processes are described in terms of "comprising" various components or steps, the products, polymers, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for manufacturing a film comprising highly refined cellulose fibers in a paper-making machine, the method comprising the steps of
   a) providing an aqueous pulp suspension comprising at least 20%, by dry weight, of highly refined cellulose fibers having an SR (Schopper-Riegler) value in a range of 80-100 at a consistency in a range of 0.8-3 wt %
   b) deflocculating and diluting the aqueous pulp suspension to a lower consistency in a range of 0.1-1.5 wt % by injecting the aqueous pulp suspension into an aqueous stream using a high shear mixer to obtain a diluted aqueous pulp suspension; and
   c) feeding the diluted aqueous pulp suspension to a headbox of a paper-making machine;
   d) forming a wet web by applying the diluted pulp suspension from the headbox onto a moving wire; and
   e) dewatering the wet web to obtain a film comprising the highly refined cellulose fibers.

2. The method according to claim 1, wherein the highly refined cellulose fibers of the pulp suspension provided in step a) have an SR value in a range of 80-98.

3. The method according to claim 1, wherein the highly refined cellulose fibers comprise microfibrillated cellulose (MFC).

4. The method according to claim 1, wherein the highly refined cellulose fibers comprise native highly refined cellulose fibers.

5. The method according to claim 1, wherein the diluted pulp suspension flow speed between the high shear mixer and the headbox does not fall below 2.5 m/s.

6. The method according to claim 1, wherein the aqueous stream in step b) comprises less than 0.1 wt % of highly refined cellulose fibers, or is free from highly refined cellulose fibers.

7. The method according to claim 1, wherein the consistency of the aqueous pulp suspension provided in step a) is in a range of 1-2.5 wt %.

8. The method according to claim 1, wherein the consistency of the diluted aqueous pulp suspension obtained in step b) is in a range of 0.1-1.2 wt %.

9. The method according to claim 1, wherein the aqueous pulp suspension in step b) is injected into the aqueous stream at a flow speed in of at least 10 m/s.

10. The method according to claim 1, wherein the high shear mixer is a static mixer.

11. The method according to claim 1, wherein the wire is subjected to shaking during forming in step d) and dewatering in step e).

12. The method according to claim 1, wherein step e) comprises:
   dewatering and drying the web to obtain a film comprising the highly refined cellulose fiber.

13. The method according to claim 1, further wherein step e) comprises:
   partially dewatering the wet web to obtain a partially dewatered wet web;
   laminating the partially dewatered wet web with a second partially dewatered wet web to form a multilayer web; and
   dewatering the multilayer web to obtain the film.

14. The method according to claim 13, wherein the wire is subjected to shaking during forming in step d) and dewatering in step e).

15. The method according to claim 13, wherein step e) further comprises:
dewatering and drying the multilayer web to obtain a film comprising the highly refined cellulose fiber.

* * * * *